(12) United States Patent
Han et al.

(10) Patent No.: US 9,654,584 B2
(45) Date of Patent: May 16, 2017

(54) APPARATUS AND METHODS FOR REDUCING SOFT BUFFER SIZE IN MTC DEVICES

(71) Applicant: Intel IP Corporation, Santa Clara, CA (US)

(72) Inventors: Seunghee Han, Cupertino, CA (US); Gang Xiong, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 86 days.

(21) Appl. No.: 14/582,612

(22) Filed: Dec. 24, 2014

(65) Prior Publication Data

US 2015/0312371 A1    Oct. 29, 2015

Related U.S. Application Data

(60) Provisional application No. 61/990,619, filed on May 8, 2014, provisional application No. 61/985,391, filed on Apr. 28, 2014, provisional application No. 61/968,282, filed on Mar. 20, 2014.

(51) Int. Cl.
| | |
|---|---|
| *H04L 1/18* | (2006.01) |
| *H04L 29/08* | (2006.01) |
| *H04L 5/16* | (2006.01) |

(52) U.S. Cl.
CPC ........ *H04L 67/2852* (2013.01); *H04L 1/1822* (2013.01); *H04L 1/1845* (2013.01); *H04L 5/16* (2013.01); *H04L 67/12* (2013.01)

(58) Field of Classification Search
CPC . H04L 1/1835; H04L 67/2852; H04L 1/1822; H04L 1/1845; H04L 5/16

USPC .......................................................... 370/281
See application file for complete search history.

(56) References Cited

U.S. PATENT DOCUMENTS

| | | | |
|---|---|---|---|
| 2010/0050034 A1 | 2/2010 | Che et al. | |
| 2011/0004806 A1* | 1/2011 | Adachi ............ | H03M 13/2782 714/763 |
| 2012/0057529 A1 | 3/2012 | Seo et al. | |
| 2012/0087396 A1* | 4/2012 | Nimbalker ............ | H04L 1/1822 375/219 |
| 2012/0195398 A1 | 8/2012 | Shen et al. | |
| 2012/0287973 A1 | 11/2012 | Shen et al. | |

(Continued)

OTHER PUBLICATIONS

"Revised Work Item on Low cost & enhanced coverage MTC UE for LTE", RP-140522, 3GPP TSG RAN Meeting #63, Fukuoka, Japan, Mar. 3-6, 2014, 7 pages.

(Continued)

*Primary Examiner* — Ronald B Abelson
(74) *Attorney, Agent, or Firm* — Stoel Rives LLP

(57) ABSTRACT

A machine type communication (MTC) device is configured to communicate through a long term evolution (LTE) network. The MTC device include a wireless transceiver to receive a signal through the LTE network, a soft buffer configured to store a plurality of soft channel bits for up to a maximum number of hybrid automatic retransmission request (HARQ) processes, and a signal processing unit. The signal processing unit is configured to determine a total number of soft channel bits based at least on the maximum number of HARQ processes, and to use limited buffer rate matching (LBRM) to store a reduced number of the total number of soft channel bits in the soft buffer.

21 Claims, 8 Drawing Sheets

(56) References Cited

U.S. PATENT DOCUMENTS

| | | | | |
|---|---|---|---|---|
| 2012/0300699 A1* | 11/2012 | Kamuf | ............... | H04L 1/1845 |
| | | | | 370/328 |
| 2013/0286904 A1* | 10/2013 | Xu | ..................... | H04L 5/001 |
| | | | | 370/280 |
| 2014/0185495 A1* | 7/2014 | Kuchibhotla | ....... | H04W 76/023 |
| | | | | 370/281 |
| 2014/0187283 A1 | 7/2014 | Nimbalker et al. | | |

OTHER PUBLICATIONS

3GPP TS 36.212, "Technical Specification Group Radio Access Network; Evolved Universal Terrestrial Radio Access (E-UTRA); Multiplexing and channel coding (Release 12)", Version 12.2.0, Sep. 2014, pp. 15-18.

Intel Corporation, "Discussion on UE complexity reduction for eMTC", R1-143768, 3GPP TSG RAN WG1 Meeting #78bis, Ljubljana, Slovenia, Oct. 6-10, 2014, 6 pages.

Intel Corporation, "Remaining issues for low cost MTC UE", R1-142024, 3GPP TSG-RAN WG1 #77, Seoul, Korea, May 19-23, 2014, 7 pages.

Motorola, et al., "Proposal for Limited Buffer Rate Matching", R1-075106, 3GPP TSG RAN1#51, Jeju, Korea, Nov. 5-9, 2007, 3 pages.

PCT/US2015/019453, International Search Report and Written Opinion, May 29, 2015, 14 pages.

3GPP TS 25321, "3rd Generation Partnership Project; Technical Specification Group Radio Access Network; Medium Access Control (MAC) protocol specification", (Release 10) V10.2.0, Mar. 2011, 198 pages.

\* cited by examiner

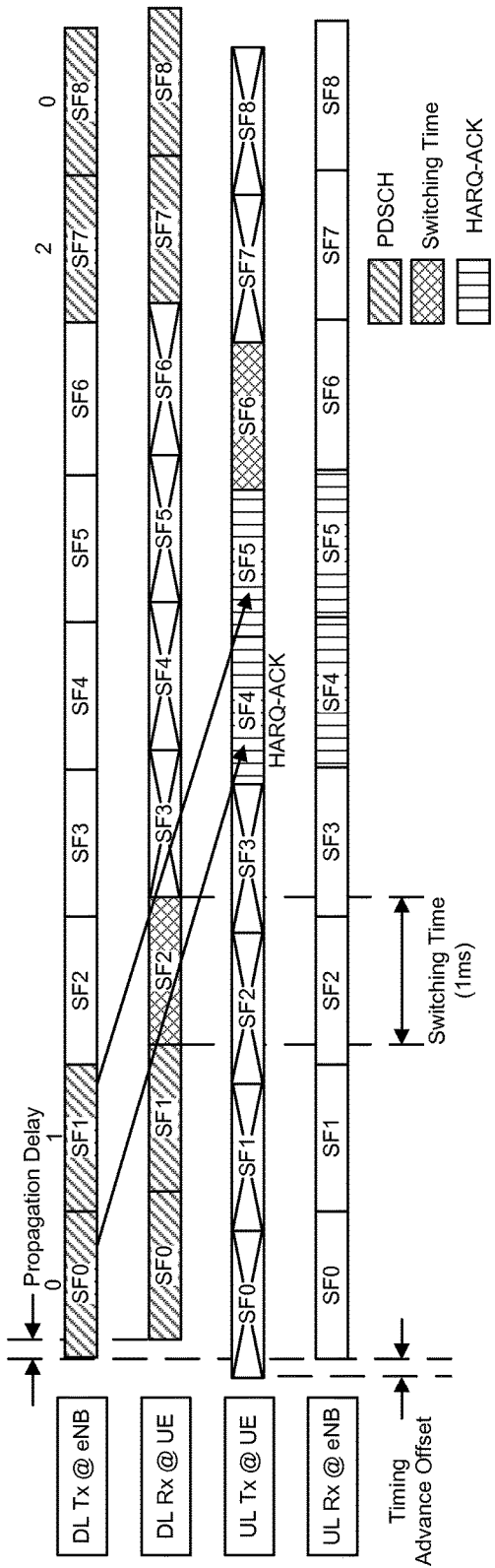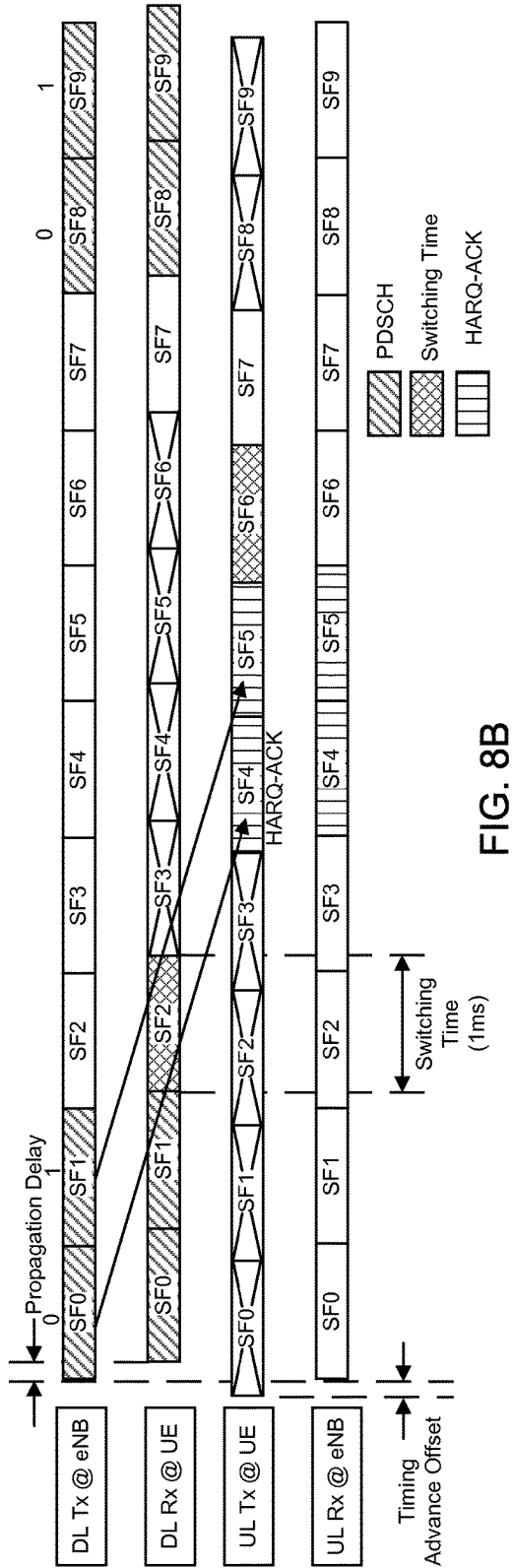
FIG. 8A
FIG. 8B

APPARATUS AND METHODS FOR REDUCING SOFT BUFFER SIZE IN MTC DEVICES

RELATED APPLICATIONS

This application claims the benefit under 35 U.S.C. §119 (e) of U.S. Provisional Application No. 61/968,282, filed Mar. 20, 2014, U.S. Provisional Application No. 61/985,391, filed Apr. 28, 2014, and U.S. Provisional Application No. 61/990,619, filed May 8, 2014, each of which is hereby incorporated by reference herein in its entirety.

TECHNICAL FIELD

This disclosure relates generally to wireless communication networks. Specifically, this disclosure relates to low-cost machine type communication (MTC) devices.

BACKGROUND INFORMATION

Machine type communication (MTC), also called machine to machine (M2M) communication, is of interest to mobile network operators, equipment vendors, MTC specialist companies, and research bodies. M2M communications enable M2M components to be interconnected, networked, and controlled remotely with low-cost scalable and reliable technologies. Such M2M communications could be carried over mobile networks, in which case the role of mobile network is largely confined to serve as a transport network.

A user equipment device (or simply, UE) used as an MTC device for MTC communications in MTC applications (or simply, MTC) has characteristics such as being nomadically (re-)deployed, having low mobility while deployed, being deployed in locations with low signal strength (e.g., in "poor coverage areas"), proving low priority communications, and infrequently sending small amounts of mobile originated (MO) or mobile terminated (MT) data. For example, a smart meter for utility metering applications is a type of UE used as an MTC device (referred to generally as a UE). Such metering devices could monitor municipal utility service usage to periodically report information on energy consumption to service providers. Metering devices may autonomously push reports of usage information to a centralized node in a network, or the centralized node may poll metering devices as reporting information is needed.

Road security is another example application of monitoring. For instance, in the event of a car accident, an in-vehicle emergency call service would autonomously report location information of the car accident to an emergency first responder and thereby facilitate prompt assistance. Other road-security applications for monitoring include intelligent traffic management, automatic ticketing, fleet management, and other uses.

Consumer electronics, including devices such as eBook readers, digital cameras, personal computers, and navigation systems, could also benefit from monitoring. For example, such devices could use monitoring to upgrade firmware or to upload and download online content.

BRIEF DESCRIPTION OF THE DRAWINGS

FIGS. 8A, 8B, 9A, and 9B illustrate example hybrid automatic retransmission request (HARQ) processes for a low-cost MTC device according to certain embodiments.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

MTC devices are generally low-cost devices. However, there is an effort to further reduce the cost and size of low-cost MTC devices. As discussed below, rate matching in user equipment (UE), such as MTC devices, generally uses a large amount of memory to store soft channel bits for hybrid automatic retransmission request (HARQ) processes. The soft channel bits are related to the implementation of soft buffer size. Certain embodiments disclosed herein reduce the soft channel bits to reduce size and cost in terms of memory for MTC devices. In such embodiments, the soft buffer size is a function of a maximum supported transport block (TB) size, the number of HARQ processes, turbo encoding and decoding, and application of limited buffer rate matching (LBRM). Certain embodiments may reduce the number of soft channel bits by about 50%, as compared to other approaches using the same number of HARQ processes. In addition, or in other embodiments, the cost savings may be increased by lowering the number of HARQ processes for low-cost MTC devices.

In a third generation partnership project (3GPP) radio access network (RAN) long term evolution (LTE) system, a node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device, known as a user equipment (UE). The DL transmission may be a communication from the node (e.g., eNB) to the wireless device (e.g., UE), and the UL transmission may be a communication from the wireless device to the node. As used herein, the terms "node" and "cell" are both intended to be synonymous and refer to a wireless transmission point operable to communicate with multiple user equipment, such as an eNB, a low power node, or other base station.

Figure 1:
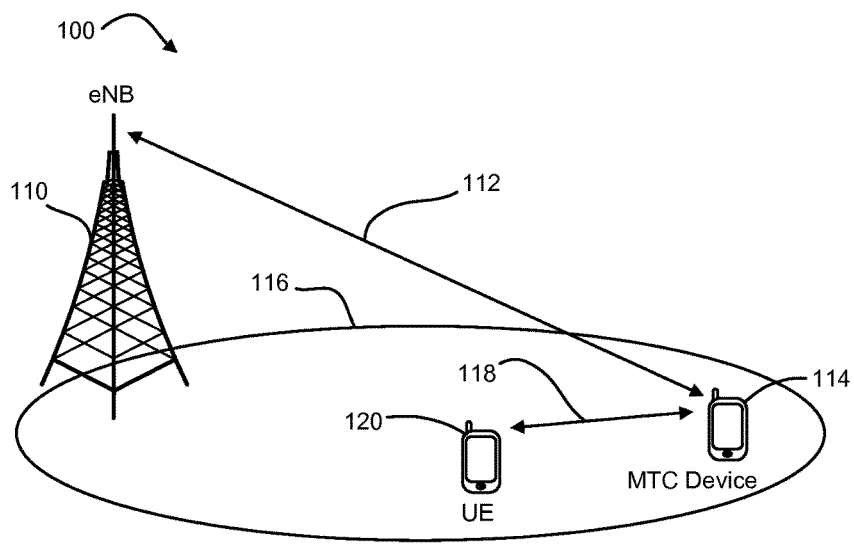
FIG. 1 is a block diagram of a communication network according to certain embodiments.

FIG. 1 is a block diagram of a communication network 100 including a node (eNB 110) configured to communicate uplink (UL) and downlink (DL) user data 112 with a UE (low-cost MTC device 114) according to certain embodiments. The MTC device 114 is shown within a coverage area 116 of the eNB 110. The MTC device 114 may also be configured for direct communication 118 with another UE 120. While the example shows the UE 120 within the coverage area 116 of the eNB 110, the direct communication 118 may also occur when the UE 120 is located outside the coverage area 116. The MTC device 114 is configured in certain embodiments to use LBRM to reduce the number of soft channel bits for HARQ processes.

Figure 2:
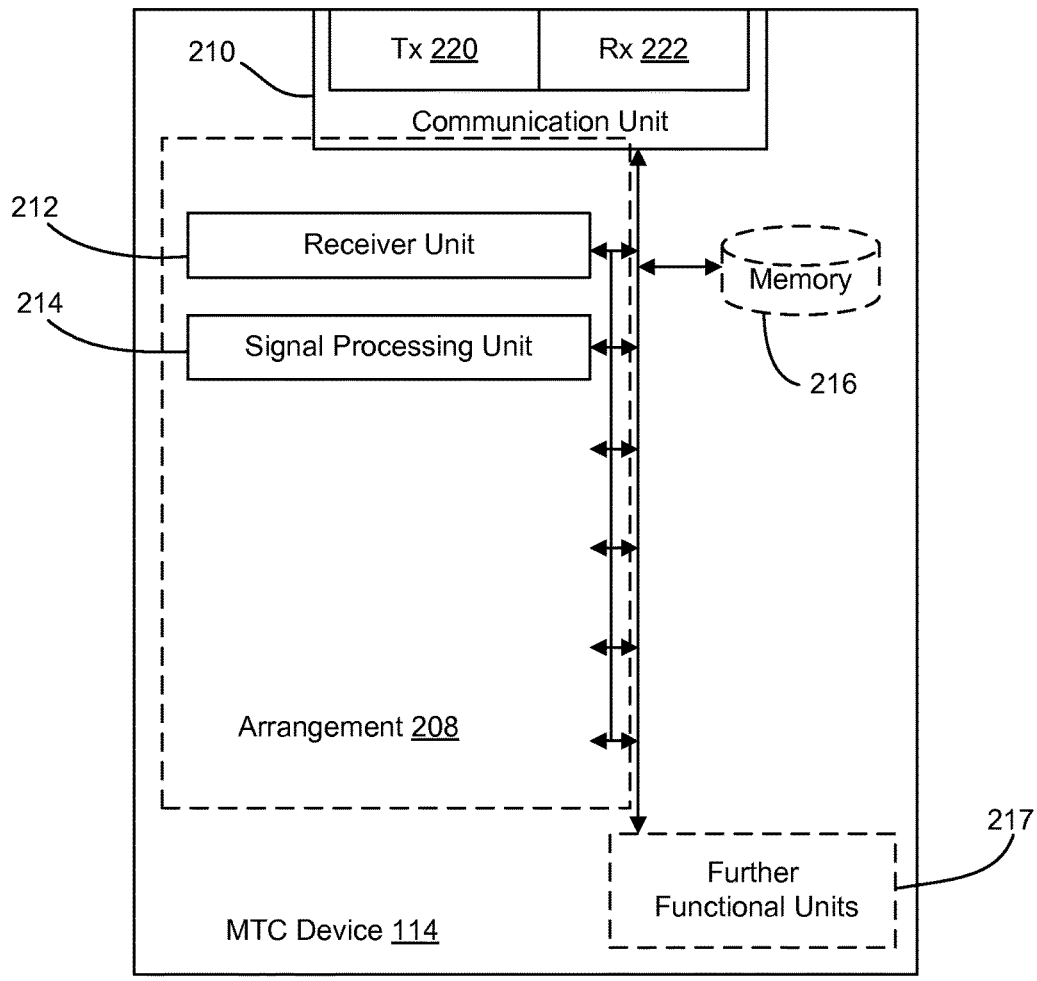
FIG. 2 is a block diagram of an example MTC device according to one embodiment.

FIG. 2 is a block diagram of an example MTC device 114 according to one embodiment. Embodiments described herein relate to the MTC device 114 operable in a wireless communication system, such as the communication network 100 shown in FIG. 1. The MTC device 114 is configured to use LBRM to reduce the number of soft channel bits for HARQ processes.

The MTC device 114 includes an arrangement 208, which is shown surrounded by a dashed line. The MTC device 114 may be a low-cost MTC device. The MTC device 114 and arrangement 208 is further illustrated as to communicate with other entities via a communication unit 210, which may be regarded as part of the arrangement 208. The communication unit 210 comprises means for communication, such as a receiver (Rx) 222 and a transmitter (Tx) 220, or a transceiver. The communication unit 210 may alternatively be denoted "interface". The arrangement may further comprise other functional units 217, such as functional units providing regular UE functions, and may further comprise one or more memory units 216.

The arrangement 208 may be implemented, for example, by one or more of: a processor or a microprocessor and adequate software and memory for storing thereof, a programmable logic device (PLD) or other electronic component(s) or processing circuitry configured to perform the actions described herein.

The arrangement 208 comprises a receiver unit 212, adapted to receive a signal via a carrier (e.g., an UL carrier, a DL carrier, an M2M carrier, or a device to device (D2D) carrier). The receiver unit 212 passes the signal to a signal processing unit 214.

Figure 3:
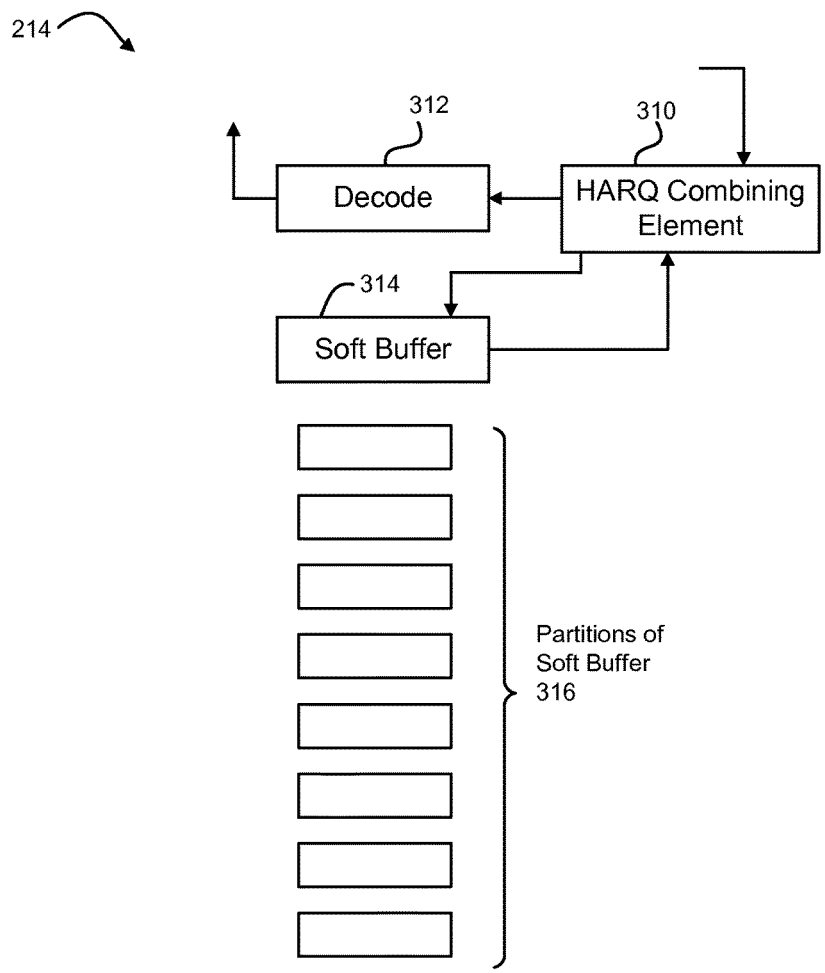
FIG. 3 is a block diagram of the signal processing unit shown in FIG. 2 according to one embodiment.

FIG. 3 is a block diagram of the signal processing unit 214 shown in FIG. 2 according to one embodiment. The signal processing unit 214 may be implemented in hardware, software, or a combination of the two. The signal processing unit 214 is organized into functional blocks depicted in FIG. 3. The signal is received by the transceiver in FIG. 2, which demodulates the signal and generates received log-likelihood ratios (LLRs) for a given TB. A HARQ combining element 310 combines the received LLRs with stored LLRs for the TB from a previous transmission. The combined LLRs are decoded by the processor 304 at block 312 (e.g., a turbo decoder) and may be passed to another process (e.g., sent to higher layers for further processing). If the TB is not successfully decoded (as determined, e.g., by a cyclic redundancy check (CRC) function of the signal processing unit 214), then the combined LLRs for that TB are stored in a partition 316 of a soft buffer 314. If a TB is not successfully decoded at block 312, the MTC device 114 may transmit the HARQ feedback on its uplink. The soft buffer 314 holds the combined LLR for a TB until the MTC device 114 makes another attempt to decode the TB.

The transmitting entity (e.g., the eNB 110 or the UE 120 shown in FIG. 1), upon receiving the HARQ feedback indicating the MTC device 114 has not successfully received the TB, attempts to retransmit the TB. The retransmitted TB is put through the same functional blocks as before, but when the MTC device 114 attempts to decode the retransmitted TB at block 312, the MTC device 114 retrieves the LLRs for the TB from its memory unit 216, and uses the HARQ combining element 310 to combine the received LLRs and the stored LLRs for the TB in a process known as "soft combining." The combined LLRs are provided to the decoder at block 312, which decodes the TB and provides the successfully decoded TB to higher layers for further processing.

The soft buffer 314 may also be referred to as a HARQ memory or HARQ buffer. Since there are multiple HARQ processes, a HARQ process index or HARQ identity (typically signaled using an explicit field within downlink control information (DCI) format associated with the TB (e.g. for downlink), or implicitly determined via subframe number (SN), system frame number (SFN), etc. (e.g. for uplink)) is made available for the HARQ combining element 310 to correctly perform the combining operation. For the uplink transmission, the implicit HARQ process index is used by the MTC device 114 to correctly determine the coded bits for uplink transmissions. If the MTC device 114 is configured with a transmission mode with a maximum of one TB per HARQ process (or one TB per transmission timing interval (TTI)), the soft buffer 314 of the MTC device 114 may be divided into eight partitions 316, as shown in FIG. 3.

For frequency division duplexing (FDD), for a given component carrier, the MTC device 114 may have eight HARQ processes in DL. In some scenarios, if the MTC device 114 has insufficient amount of storage for a given transport block, and a decoding failure occurs, the MTC device 114 may choose to store some LLRs and discard some other LLRs. In other scenarios, if no storage is available or no storage is deemed necessary for a transport block, if a decoding failure occurs, the MTC device 114 may discard all LLRs corresponding to the transport block. Such scenarios typically occur where the network entity transmits a quantity of coded bits that exceed the storage capacity of the UE. For FDD, and for uplink, for a given component carrier, the MTC device 114 may have eight HARQ processes when the MTC device 114 is not configured in UL-MIMO transmission mode. For TDD, the number of HARQ processes for the uplink is determined based on the TDD UL/DL configuration.

With reference to Table 1, the soft buffer dimensioning for a low-cost MTC device (i.e., a UE Category 0 in 3GPP LTE standards) when using full buffer rate matching (FBRM) is determined by the total number of soft channel bits. The derivation of the soft buffer size is based on the maximum TB size, turbo encoding/decoding, and the number of HARQ processes.

TABLE 1

DL physical layer parameter values set by field ue-Category

| UE Category | Maximum number of DL-SCH transport block bits received within a TTI | Maximum number of bits a DL-SCH transport block received within a TTI | Total number of soft channel bits | Maximum number of supported layers for spatial multiplexing in DL |
|---|---|---|---|---|
| Category 0 | 1000 | 1000 | 25344 | 1 |

For low cost MTC devices using FBRM, the soft buffer size corresponds to the total number of soft channel bits (25344 bits), which is derived as follows:
Maximum TB per TTI: 1000 bits;
TB size per codeword (B): 1000;

Number of codeblocks (C): Ceil{(B=24/(6144−24}=1;
TB size together with cyclic redundancy check (CRC), (B'): (B+24)=1024;
Turbo code interleave size (K): B'/C=1024;
Turbo code trellis term (T): K+4=1028;
Subblock interleave size (V)=Ceil(T/32)32=1056;
Number of padding bits: V−T=28;
Total soft buffer size: V*(1/mother coding rate)*C*(max HARQ processes)=1056*3*1*8=25344 bits, where the mother coding rate=⅓ and max HARQ processes=8.

Certain embodiments further reduce the cost of low-cost MTC devices by applying LBRM to reduce the total number of soft channel bits. For LTE, up to 50% soft buffer reduction is provided by LBRM for the higher UE categories (e.g., 3, 4, and 5), while it is not applied to the lower UE categories (e.g., 1 and 2). There may be little or no noticeable performance difference, particularly when up to four HARQ processes are used. Even when using more than four HARQ processes, the performance degradation using LBRM may be very marginal.

Figure 4:
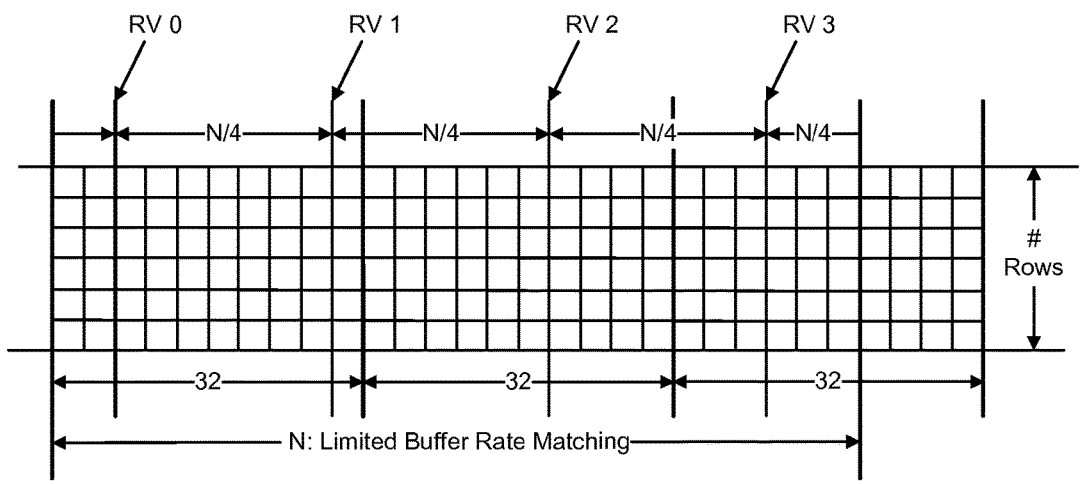
FIG. 4 illustrates an example embodiment of limited buffer rate matching (LBRM).

FIG. 4 illustrates an example embodiment of LBRM. After turbo encoding, the encoded bit size becomes three times (3×) the information bit size. Thus, in the example shown in FIG. 4, 32 sub-block interleave columns correspond to the information bits and would be repeated three times (32×3=96 columns) for FBRM. For LBRM, however, the soft buffer size is reduced by forcing an early wrap-around after N columns. LBRM also compresses the redundancy version (RV) locations (shown as RV0, RV1, RV2, and RV3) so that each of the RVs is located prior to the wrap-around point. RV is defined by four equal divisions of the number of sub-block interleave columns after LBRM (N/4). The RV0 is offset by two columns and an RV definition column is quantized by two columns.

As shown in Table 2, in certain embodiments, using LBRM with low-cost MTC devices reduces the soft buffer size to 12672 (=25344/2) bits. In general, the total number of soft channel bits is calculated with LBRM as follows:

Total number of soft channel bits=V*(mother code rating)*C*(max HARQ processes)/2.

Note that if any parameters to derive V (subblock interleave size) are changed, it may be reflected by the above equation (as illustrated in examples below).

TABLE 2

DL physical layer parameter values set by field ue-Category with LBRM

| UE Category | Maximum number of DL-SCH transport block bits received within a TTI | Maximum number of bits a DL-SCH transport block received within a TTI | Total number of soft channel bits | Maximum number of supported layers for spatial multiplexing in DL |
|---|---|---|---|---|
| Category 0 | 1000 | 1000 | 12672 | 1 |

For low-cost MTC devices, there is little or no performance loss between LBRM and FBRM when TB size (TBS) is equal to or smaller than (TBS_max/2), or when the MTC device is operating around the signal-to-noise ratio (SNR) point, or when effective coding rate is equal to or greater than (2*TBS)/(3*TBS_max) with CC (Chase Combining) or for initial transmission only with incremental redundancy (IR).

Figures 5A, 5B:
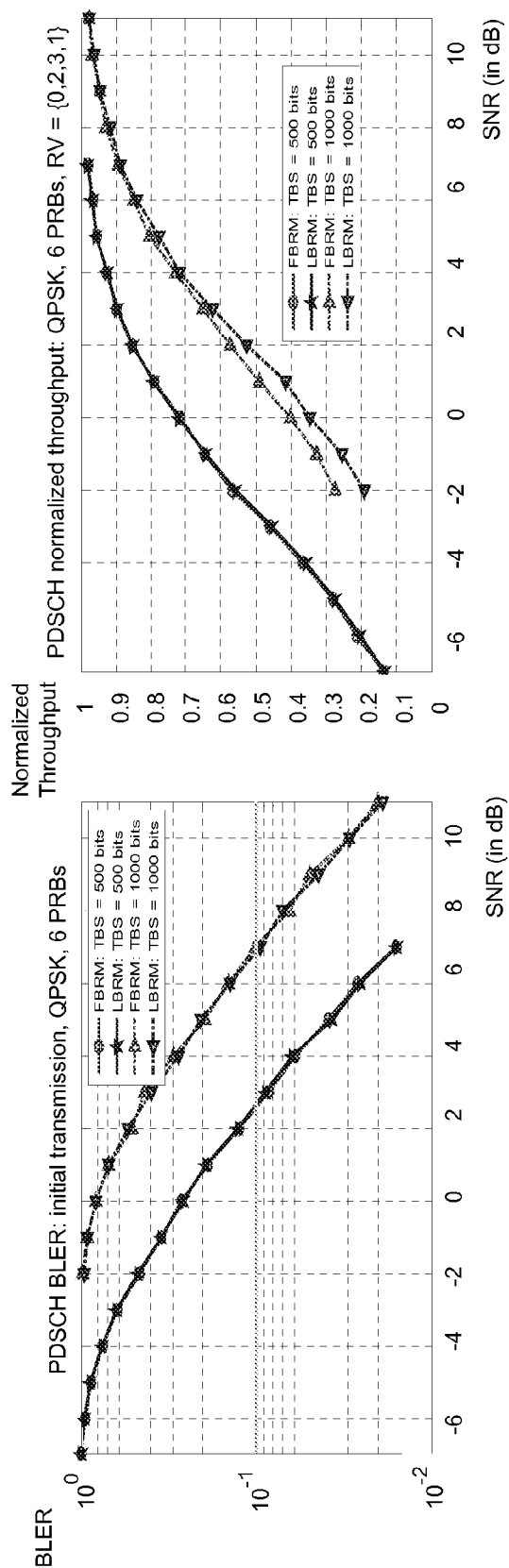
FIGS. 5A, 5B, 6A, 6B, 7A, and 7B are graphs showing performance comparisons between full buffer rate matching (FBRM) and LBRM according to certain embodiments.
Figures 6A, 6B:
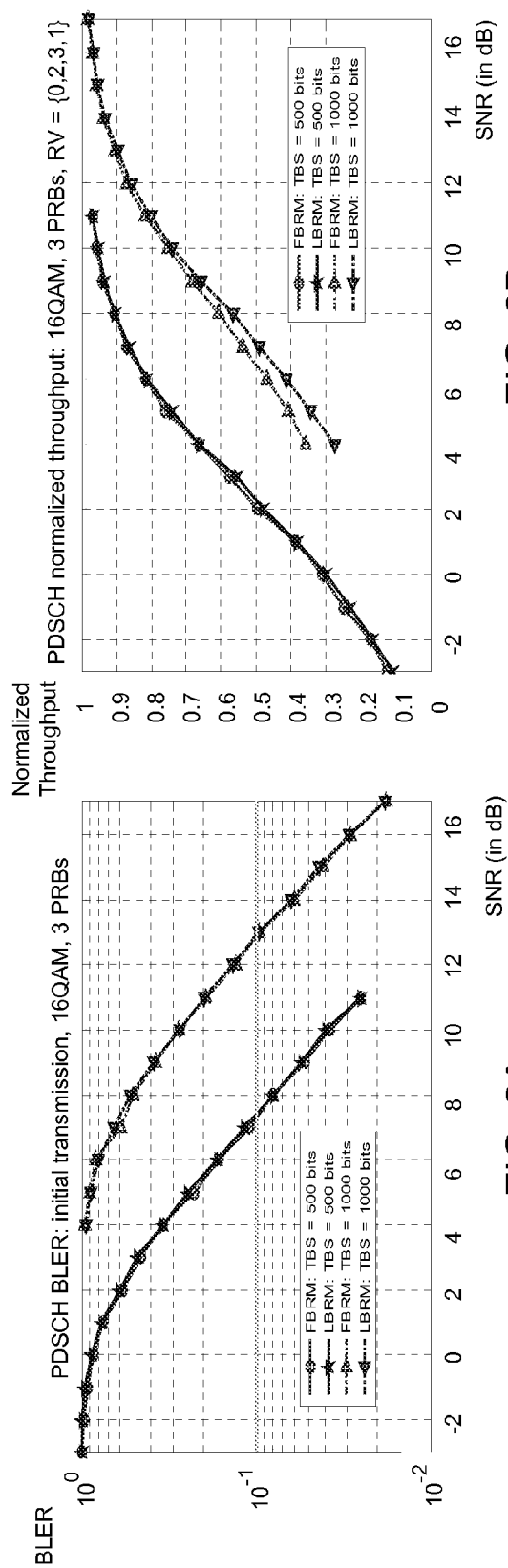
Figures 7A, 7B:
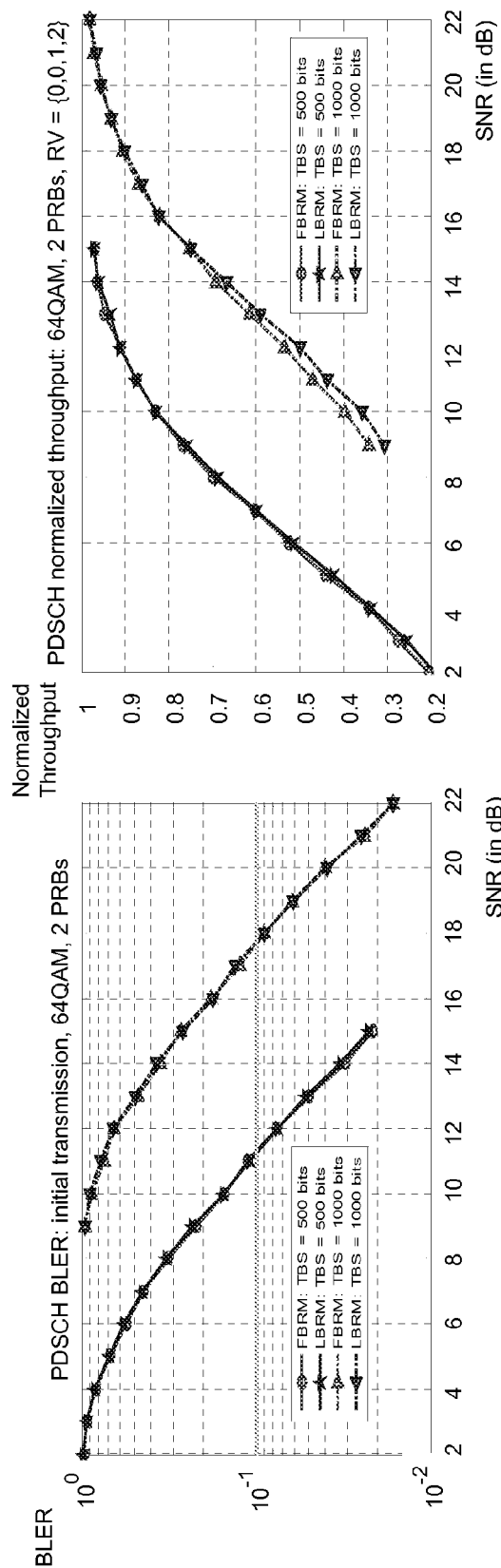

For example, FIGS. 5A, 5B, 6A, 6B, 7A, and 7B are graphs showing performance comparisons between FBRM and LBRM according to certain embodiments. The illustrated performance comparisons between FBRM and LBRM are in terms of initial transmission block error rate (BLER) in FIGS. 5A, 6A, and 7A, and normalized throughput in FIGS. 5B, 6B, and 7B. FIGS. 5A and 5B illustrate examples using quadrature phase shift keying (QPSK) and six physical resource blocks (PRBs). FIGS. 6A and 6B illustrate examples using 16-quadrature amplitude modulation (QAM) and three PRBs. FIGS. 7A and 7B illustrate examples using 64 QAM and two PRBs. The simulation model and parameters for each of the example graphs include a bandwidth of 10 MHz, a carrier frequency of 2 GHz, an FDD frame type, a TM2 transmission mode, a multiple input multiple output (MIMO) configuration of 2×1 with low correlation, an extended pedestrian A (EPA) channel model, a Doppler shift of 1 Hz, and a target BLER of 10%. In the simulations, two TBS sizes are considered: 500 and 1000 bits, which correspond to effective coding rates of ⅓ and ⅔, respectively.

From the plots, it can be observed that BLER performance difference for initial transmission between FBRM and LRBM is negligible. In addition, when considering the operating SNR points (assuming 10% BLER in FIGS. 5A, 6A and 7A), no throughput performance degradation is observed for LBRM. Accordingly, in certain embodiments, a low-cost MTC device uses LBRM and includes a soft buffer size of no more than 12672 bits.

In addition, or in other embodiments, the soft buffer size is reduced even more when half-duplex FDD (HD-FDD) is used to reduce the number of HARQ processes. For HD-FDD, due to half-duplex restraints (e.g., simultaneous transmit and receive may not be allowed), in certain embodiments, not every subframe (SF) can be used for transmitting and receiving. Thus, the number of HARQ processes can be reduced to further reduce the soft buffer size.

For example, FIGS. 8A, 8B, 9A, and 9B illustrate example HARQ processes for a low-cost MTC UE according to certain embodiments. In these examples, a transition time between UL and DL may be up to about 1 ms (one subframe) e.g., if a single oscillator is used for the low-cost MTC UE.

FIG. 8A shows a HARQ procedure for half duplex in a low-cost MTC UE with a 1 ms transition time. HARQ-ACKs corresponding to physical downlink shared channels (PDSCHs) at SF0 and SF1 are transmitted from a node to a UE at SF4 and SF5, respectively. If the PDSCHs are successfully decoded at the MTC UE (i.e., the MTC UE sends ACK to eNB), a new PDSCH can be transmitted in the next available subframe SF7 and SF8. SF2 and SF6 are used for transition time for DL to UL and for UL to DL, respectively.

A first HARQ process corresponds to SF0 and SF8 (as denoted by "0" above SF0 and SF8). A second HARQ process corresponds to SF1 (as denoted by "1" above SF1). A third HARQ process is corresponding to SF7 (as denoted by "2") above SF7). In this example, SF2, SF3, SF4, SF5, and SF6 cannot be used by the MTC UE for reception (DL) for HD-FDD due to switching time and UL transmission. Further, the MTC UE cannot use SF0, SF1, SF2, SF3, SF6, SF7, and SF8 for transmission (UL) for HD-FDD due to switching time and DL reception. From the illustrated operation, the maximum number of HARQ processes for half duplex low cost MTC UE is three. As shown in Table 3, when the number of HARQ processes for HD-FDD is three, the total number of soft channel bits with LBRM can be 1056*3*1*3/2=4752 bits.

While the example shown in FIG. 8A shows SF7 used for a third HARQ process, FIG. 8B shows an example where SF7 is not used for a HARQ process. Accordingly, the maximum number of HARQ processes is two for the half duplex in low cost MTC UE with 1 ms transition time in FIG. 8B. As shown in Table 3, when the number of HARQ processes for HD-FDD is two, the total number of soft channel bits with LBRM may be 1056*3*1*2/2=3168 bits.

If considering the HARQ buffer for system information block (SIB)-1 together, the maximum number of HARQ processes for half duplex low cost MTC UE is four, which Table 3 shows corresponds to 4752 total soft channel bits for HD-FDD. The maximum number of HARQ processes for half duplex low cost MTC UE can also be one to have a minimum cost. As shown in Table 3, when the number of HARQ processes for HD-FDD is 1, the total number of soft channel bits with LBRM can be 1056*3*1*1/2=1584 bits.

TABLE 3

Total number of soft channel bits according to number of HARQ processes for HD-FDD

| | HD-FDD with LBRM | | HD-FDD with FBRM | |
|---|---|---|---|---|
| Number of HARQ processes for HD-FDD | Total number of soft channel bits | Cost savings (%) compared to conventional 25344 total soft channel bits | Total number of soft channel bits | Cost savings (%) compared to conventional 25344 total soft channel bits |
| 1 | 1584 | 93.75 | 3168 | 87.5 |
| 2 | 3168 | 87.5 | 6336 | 75 |
| 3 | 4752 | 81.25 | 9504 | 62.5 |
| 4 | 6336 | 75 | 12672 | 50 |
| 5 | 7920 | 68.75 | 15840 | 37.5 |
| 6 | 9504 | 62.5 | 19008 | 25 |
| 7 | 11088 | 56.25 | 22174 | 12.5 |
| 8 | 12672 | 50 | 25344 | 0 |

At least some of the values shown in Table 3 may also apply to full-duplex FDD (FD-FDD). Further, the values shown in Table 3 are provided by way of example and persons skilled in the art will recognize from the disclosure herein that changes to system configurations may produce different results for the total number of soft channel bits. For example, Table 4 shows variations in certain system parameters when the maximum TBS=968 bits and when the maximum TBS=1032 bits. Table 5 and Table 6 show the resulting changes to the total number of soft channel bits.

TABLE 4

Example parameters with max TBS of 968 bits and 1032 bits

| | Max TBS = 968 bits | Max TBS = 1032 bits |
|---|---|---|
| TB size per codeword (B) | 968 | 1032 |
| Number of codeblocks (C) | 1 | 1 |
| TB size together with CRC (B') | 992 | 1056 |
| Turbo code interleave size (K) | 992 | 1056 |
| Turbo code trellis term (T) | 996 | 1060 |
| Subblock interleave size (V) | 1024 | 1088 |
| Total soft buffer size | 24576 | 26112 |

TABLE 5

Total number of soft channel bits for max TBS of 968 bits

| | HD-FDD with LBRM | | HD-FDD with FBRM | |
|---|---|---|---|---|
| Number of HARQ processes for HD-FDD | Total number of soft channel bits | Cost savings (%) compared to conventional 25344 total soft channel bits | Total number of soft channel bits | Cost savings (%) compared to conventional 25344 total soft channel bits |
| 1 | 1536 | 93.75 | 3072 | 87.5 |
| 2 | 3072 | 87.5 | 6144 | 75 |
| 3 | 4608 | 81.25 | 9216 | 62.5 |
| 4 | 6144 | 75 | 12288 | 50 |
| 5 | 7680 | 68.75 | 15360 | 37.5 |
| 6 | 9216 | 62.5 | 18432 | 25 |
| 7 | 10752 | 56.25 | 21504 | 12.5 |
| 8 | 12288 | 50 | 24576 | 0 |

TABLE 6

Total number of soft channel bits for max TBS of 1032 bits

| | HD-FDD with LBRM | | HD-FDD with FBRM | |
|---|---|---|---|---|
| Number of HARQ processes for HD-FDD | Total number of soft channel bits | Cost savings (%) compared to conventional 25344 total soft channel bits | Total number of soft channel bits | Cost savings (%) compared to conventional 25344 total soft channel bits |
| 1 | 1632 | 93.75 | 3264 | 87.5 |
| 2 | 3264 | 87.5 | 6528 | 75 |
| 3 | 4896 | 81.25 | 9792 | 62.5 |
| 4 | 6528 | 75 | 13056 | 50 |
| 5 | 8160 | 68.75 | 16320 | 37.5 |
| 6 | 9792 | 62.5 | 19584 | 25 |
| 7 | 11424 | 56.25 | 22848 | 12.5 |
| 8 | 13056 | 50 | 26112 | 0 |

Figure 9A:
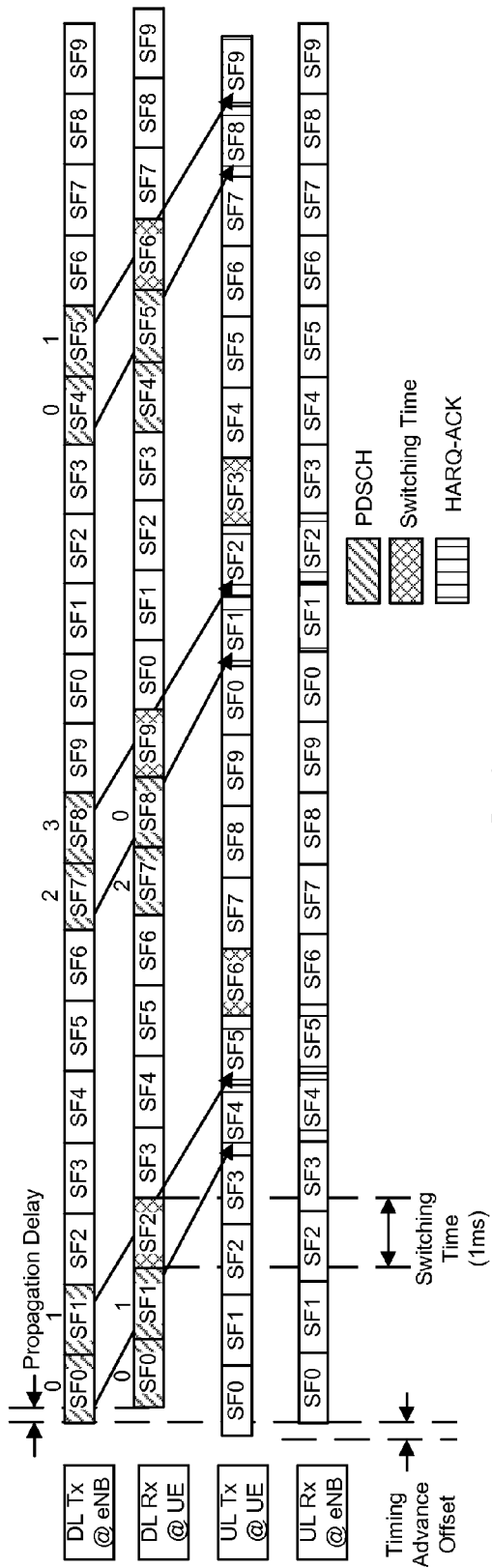
Figure 9B:
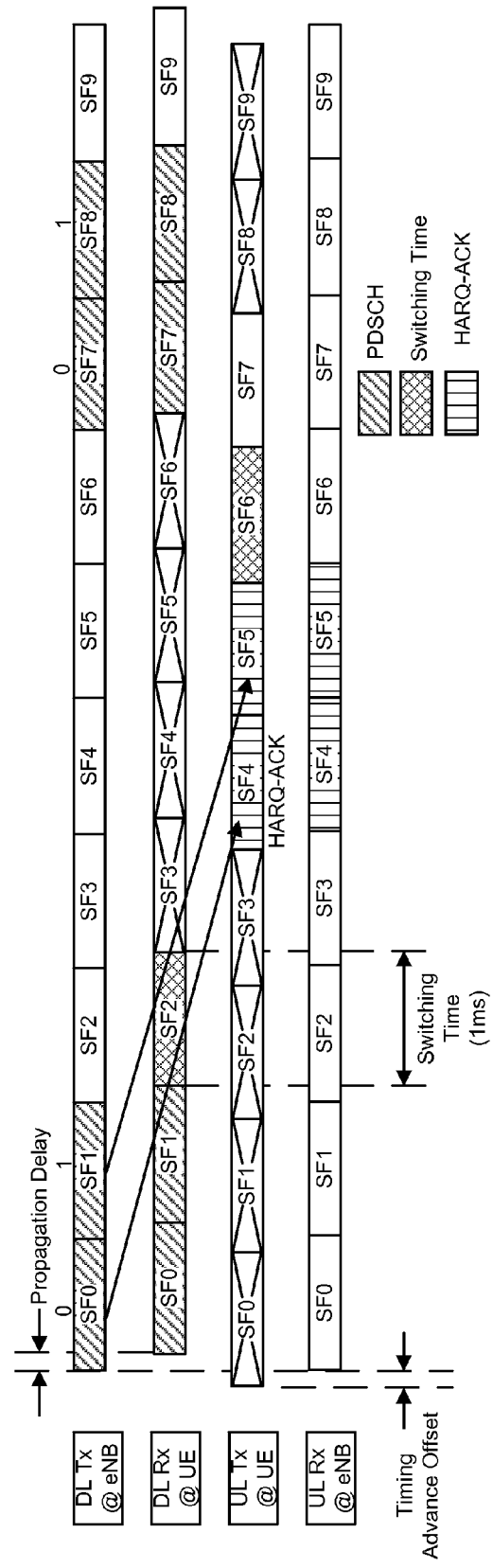

Other parameters may be changed to reduce the number of HARQ processes. For example, FIGS. 9A and 9B illustrate example HARQ processes for a low-cost MTC UE with different HARQ round trip timer (RTT) timers. The HARQ RTT timer is a parameter that specifies a minimum amount of subframe(s) before DL HARQ retransmission is expected by the UE. FIG. 9A shows the HARQ operation with 1 ms transmission gap for HARQ RTT timer=14. By changing HARQ RTT timer from 8 to 14, the maximum number of HARQ processes becomes four. Similarly, FIG. 9B shows the HARQ operation with 1 ms transition gap for HARQ RTT timer =7. By changing HARQ RTT timer from 8 to 7, the maximum number of HARQ processes becomes two.

There may be a trade-off between the number of HARQ processes and the HARQ RTT timer. With a larger HARQ RTT timer, a larger maximum number of HARQ processes can be achieved. For example, if the HARQ RTT timer=21, the maximum number of HARQ processes becomes six.

Table 7 shows further examples of different HARQ RTT timers and corresponding maximum number of HARQ processes. According to certain embodiments, the relationship between the HARQ RTT timer and maximum number of HARQ processes are given by 2*(HARQ RTT Timer)/7".

TABLE 7

Max number of HARQ processes according to HARQ RTT timer

| HARQ RTT timer | Maximum number of HARQ processes |
|---|---|
| 7 | 2 |
| 14 | 4 |

TABLE 7-continued

Max number of HARQ processes according to HARQ RTT timer

| HARQ RTT timer | Maximum number of HARQ processes |
|---|---|
| 21 | 6 |
| 28 | 8 |
| 35 | 10 |

Figure 10:
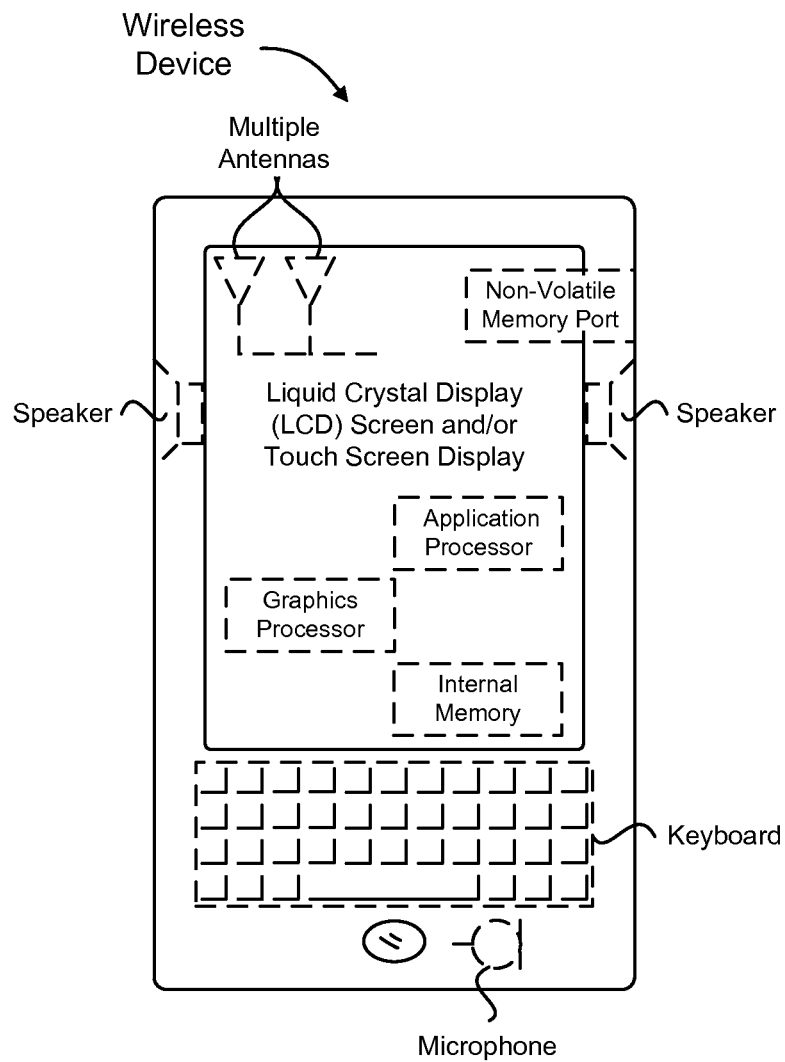
FIG. 10 is an example illustration of a mobile device according to one embodiment.

FIG. 10 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Additional Example Embodiments

The following are examples of further embodiments:

Example 1 is a MTC device configured to communicate through a LTE network that includes a wireless transceiver, a soft buffer, and a signal processing unit. The wireless transceiver is configured to receive a signal through the LTE network. The soft buffer is configured to store a plurality of soft channel bits for up to a maximum number of HARQ processes. The signal processing unit is configured to determine a total number of soft channel bits based on the maximum number of HARQ processes, a subblock interleave size, a coding rate, and a number of code blocks and to store, with LBRM, a reduced number of the total number of soft channel bits in the soft buffer.

In Example 2, the reduced number of Example 1 includes half of the total number of soft channel bits.

In Example 3, the soft buffer of any of Examples 1-2 is sized to store only the reduced number of the total number of soft channel bits.

In Example 4, the MTC device of any of Examples 1-3 is defined in the LTE network within a UE category corresponding to 25344 total number of soft channel bits for downlink communication with an eNB, and wherein the reduced number of the total number of soft channel bits includes 12672 bits.

In Example 5, the maximum number of HARQ processes in any of Examples 1-4 is eight.

In Example 6, the signal processor of any of Examples 1-5 determines the total number of soft channel bits based on a reduced maximum number of HARQ processes for HD-FDD.

In Example 7, the reduced maximum number of HARQ processes of Example 6 includes four HARQ processes, and the reduced number of the total number of soft channel bits includes 6336 bits.

In Example 8, the reduced maximum number of HARQ processes of any of Examples 6-7 includes three HARQ processes, and the reduced number of the total number of soft channel bits includes 4752 bits.

In Example 9, the signal processor of any of Examples 1-8 determines the total number of soft channel bits based on a reduced maximum number of HARQ processes, and wherein the reduced maximum number of HARQ processes is based on a HARQ RTT timer.

Example 10 is a method that includes receiving a signal corresponding to a MTC device. The method includes demodulating the signal to generate a plurality of received LLRs corresponding to a transport block. The method include combining the received LLRs with a limited number of stored LLRs for the transport block from a previous signal. The method includes decoding the combined LLRs and performing a cyclic redundancy check to determine that the decoding failed. The method includes, in response to determining that the decoding failed, performing limited buffer rate matching to store only a limited number of the combined LLRs in a soft buffer, and requesting transmission of at least one additional signal corresponding to the transport block.

In Example 11, performing the limited buffer rate matching in Example 10 includes storing half of the combined LLRs in the soft buffer.

In Example 12, the MTC device of any of Examples 10-11 includes a low cost MTC device configured to communicate through a LTE network.

In Example 13, the low cost MTC device of Example 12 includes a category 0 UE.

In Example 14, the requesting transmission of the at least one additional signal corresponding to the transport block of any of Examples 10-13 is part of a HARQ process, and wherein the method further comprises reducing a maximum number of HARQ processes for the transport block based on using HD-FDD communication with a network node.

In Example 15, the requesting transmission of the at least one additional signal corresponding to the transport block of any of Examples 10-14 is part of a HARQ process, and wherein the method further comprises reducing a maximum number of HARQ processes for the transport block based on a HARQ RTT timer value.

Example 16 is an apparatus that includes means to perform a method as in any of Examples 10-15.

Example 17 is a machine readable storage including machine-readable instructions to implement a method or realize an apparatus as in any of Examples 10-16.

Example 18 is an apparatus that includes processing logic configured to perform a method as in any of Examples 10-15.

Example 19 is a method for communicating through a LTE network. The method includes receiving a signal through the LTE network and storing a plurality of soft channel bits for up to a maximum number of HARQ processes. The method includes determining a total number of soft channel bits based on the maximum number of HARQ processes, a subblock interleave size, a coding rate, and a number of code blocks. The method includes storing, with LBRM, a reduced number of the total number of soft channel bits in the soft buffer.

Example 20 is an apparatus that includes means to perform a method as in Examples 19.

Example 21 is a machine readable storage including machine-readable instructions to implement a method or realize an apparatus as in any of Examples 19-20.

Example 22 is an apparatus that includes processing logic configured to perform a method as in Example 19.

Example 23 is a computer program product comprising a computer-readable storage medium storing program code for causing one or more processors to perform a method. The method includes establishing a connection with an evolved Node B (eNB) in a long term evolution (LTE) network; determining a maximum number of hybrid automatic retransmission request (HARQ) processes for full duplex frequency division duplexing with the eNB; determining a reduced number of HARQ processes for half duplex frequency division duplexing with the eNB; the number being less than the maximum number; determining a total number of soft channel bits based on the reduced number of HARQ processes; and storing a reduced number of the total number of soft channel bits in a soft buffer.

Example 24 includes the subject matter of Example 23, wherein storing the reduced number of the total number of the soft channel bits comprises performing limited buffer rate matching.

Example 25 includes the subject matter of any of Examples 23-24, wherein the reduced number of the total number of the soft channel bits comprises half of the total number of soft channel bits.

Example 26 includes the subject matter of any of Examples 23-25, wherein the soft buffer is sized to store only the reduced number of the total number of soft channel bits.

Example 27 includes the subject matter of any of Examples 23-26, wherein the method further comprises configuring a user equipment (UE) as a machine type communication device for half duplex frequency division duplexing with the eNB.

Various techniques disclosed herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more modules or components, which are terms used to more particularly emphasize their implementation independence. For example, a module or component may be implemented as a hardware circuit comprising custom very large scale integration (VLSI) circuits or gate arrays, off-the-shelf semiconductors such as logic chips, transistors, or other discrete components. A module or component may also be implemented in programmable hardware devices such as field programmable gate arrays, programmable array logic, programmable logic devices, or the like.

Modules or components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified module or component need not be physically located together, but may comprise disparate instructions stored in different locations that, when joined logically together, comprise the module or component and achieve the stated purpose for the module or component.

Indeed, a module or component of executable code may be a single instruction, or many instructions, and may even be distributed over several different code segments, among different programs, and across several memory devices. Similarly, operational data may be identified and illustrated herein within modules or components, and may be embodied in any suitable form and organized within any suitable type of data structure. The operational data may be collected as a single data set, or may be distributed over different locations including over different storage devices, and may exist, at least partially, merely as electronic signals on a system or network. The modules or components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. A machine type communication (MTC) device configured to communicate through a long term evolution (LTE) network, the MTC device comprising:
   a user equipment (UE) category 0 wireless transceiver to receive a signal through the LTE network;
   a soft buffer configured to store a plurality of soft channel bits for up to a maximum number of hybrid automatic retransmission request (HARQ) processes; and
   a signal processing unit to:
      determine a total number of soft channel bits based on the maximum number of HARQ processes, a sub-block interleave size, a coding rate, and a number of code blocks; and
      store, with limited buffer rate matching (LBRM), a reduced number of the total number of soft channel bits in the soft buffer.

2. The MTC device of claim 1, wherein the reduced number comprises half of the total number of soft channel bits.

3. The MTC device of claim 1, wherein the soft buffer is sized to store only the reduced number of the total number of soft channel bits.

4. The MTC device of claim 1, wherein the MTC device is defined in the LTE network within a user equipment (UE) category corresponding to 25344 total number of soft channel bits for downlink communication with an Evolved Universal Terrestrial Radio Access Network (E-UTRAN) Node B (eNB), and wherein the reduced number of the total number of soft channel bits comprises 12672 bits.

5. The MTC device of claim 4, wherein the maximum number of HARQ processes is eight.

6. The MTC device of claim 1, wherein for half-duplex frequency division duplexing (HD-FDD), the signal processor determines the total number of soft channel bits based on a reduced maximum number of HARQ processes.

7. The MTC device of claim 6, wherein the reduced maximum number of HARQ processes comprises four HARQ processes, and wherein the reduced number of the total number of soft channel bits comprises 6336 bits.

8. The MTC device of claim 6, wherein the reduced maximum number of HARQ processes comprises three HARQ processes, and wherein the reduced number of the total number of soft channel bits comprises 4752 bits.

9. The MTC device of claim 1, wherein the signal processor determines the total number of soft channel bits based on a reduced maximum number of HARQ processes, and wherein the reduced maximum number of HARQ processes is based on a HARQ round trip timer (RTT).

10. The MTC device of claim 1, further comprising at least one of an antenna, a touch sensitive display screen, a speaker, a microphone, a graphics processor, an application processor, internal memory, a non-volatile memory port, or combinations thereof.

11. A machine type communication (MTC) device configured to communicate through a long term evolution (LTE) network, the MTC device comprising:
   a wireless transceiver to receive a signal through the LTE network;
   a soft buffer configured to store a plurality of soft channel bits for up to a maximum number of hybrid automatic retransmission request (HARQ) processes; and
   a signal processing unit to:
      determine a total number of soft channel bits based on the maximum number of HARQ processes, a sub-block interleave size, a coding rate, and a number of code blocks, wherein for half-duplex frequency division duplexing (HD-FDD), the signal processor determines the total number of soft channel bits based on a reduced maximum number of HARQ processes; and
      store, with limited buffer rate matching (LBRM), a reduced number of the total number of soft channel bits in the soft buffer.

12. The MTC device of claim 11, wherein the reduced number comprises half of the total number of soft channel bits.

13. The MTC device of claim 11, wherein the soft buffer is sized to store only the reduced number of the total number of soft channel bits.

14. The MTC device of claim 11, wherein the MTC device is defined in the LTE network within a user equipment (UE) category corresponding to 25344 total number of soft channel bits for downlink communication with an Evolved Universal Terrestrial Radio Access Network (E-UTRAN) Node B (eNB), and wherein the reduced number of the total number of soft channel bits comprises 12672 bits.

15. The MTC device of claim 14, wherein the maximum number of HARQ processes is eight.

16. The MTC device of claim 11, wherein the reduced maximum number of HARQ processes comprises four HARQ processes, and wherein the reduced number of the total number of soft channel bits comprises 6336 bits.

17. The MTC device of claim 11, wherein the reduced maximum number of HARQ processes comprises three HARQ processes, and wherein the reduced number of the total number of soft channel bits comprises 4752 bits.

18. A machine type communication (MTC) device configured to communicate through a long term evolution (LTE) network, the MTC device comprising:
   a wireless transceiver to receive a signal through the LTE network;
   a soft buffer configured to store a plurality of soft channel bits for up to a maximum number of hybrid automatic retransmission request (HARQ) processes; and
   a signal processing unit to:
      determine a total number of soft channel bits based on the maximum number of HARQ processes, a sub-block interleave size, a coding rate, and a number of code blocks, wherein the signal processor determines the total number of soft channel bits based on a reduced maximum number of HARQ processes, and wherein the reduced maximum number of HARQ processes is based on a HARQ round trip timer (RTT); and store, with limited buffer rate matching (LBRM), a reduced number of the total number of soft channel bits in the soft buffer.

19. The MTC device of claim 18, wherein the reduced number comprises half of the total number of soft channel bits.

20. The MTC device of claim 18, wherein the soft buffer is sized to store only the reduced number of the total number of soft channel bits.

21. The MTC device of claim 18, wherein the MTC device is defined in the LTE network within a user equipment (UE) category corresponding to 25344 total number of soft channel bits for downlink communication with an Evolved Universal Terrestrial Radio Access Network (E-UTRAN) Node B (eNB), and wherein the reduced number of the total number of soft channel bits comprises 12672 bits.

* * * * *